United States Patent
Takahashi

[19]

[11] Patent Number: 5,913,220
[45] Date of Patent: Jun. 15, 1999

[54] METHOD AND APPARATUS FOR REFERRING TO RELATED INFORMATION IN DRAWING PROCESSING SYSTEM

[75] Inventor: Eiji Takahashi, Kawasaki, Japan

[73] Assignee: Fujitsu Co. Ltd., Kawasaki, Japan

[21] Appl. No.: 08/762,793

[22] Filed: Dec. 9, 1996

Related U.S. Application Data

[63] Continuation of application No. 08/323,349, Oct. 14, 1994, abandoned.

[30] Foreign Application Priority Data

Apr. 12, 1994 [JP] Japan .................................. 6-073352

[51] Int. Cl.$^6$ ........................... G06F 15/00; G05B 11/00
[52] U.S. Cl. ...................................... 707/502; 364/468.15
[58] Field of Search ...................... 345/418–20, 433–37; 707/502, 511, 203, 500; 364/468.15

[56] References Cited

U.S. PATENT DOCUMENTS

| | | | |
|---|---|---|---|
| 5,165,015 | 11/1992 | Coggins | 395/155 |
| 5,200,744 | 4/1993 | Hiromoto et al. | 340/825.15 |
| 5,291,190 | 3/1994 | Scarola et al. | 340/825.06 |
| 5,291,587 | 3/1994 | Kodosky et al. | 395/500 |
| 5,293,478 | 3/1994 | Yamamoto et al. | 395/161 |
| 5,321,766 | 6/1994 | Fraas et al. | 382/2 |
| 5,341,469 | 8/1994 | Rossberg et al. | 395/145 |
| 5,347,553 | 9/1994 | Scarola et al. | 376/259 |
| 5,367,622 | 11/1994 | Coggins | 395/155 |
| 5,375,150 | 12/1994 | Scarola et al. | 376/216 |
| 5,392,208 | 2/1995 | Takita et al. | 364/188 |
| 5,412,400 | 5/1995 | Takahara et al. | 345/119 |
| 5,423,684 | 6/1995 | Hurst et al. | 434/218 |
| 5,444,836 | 8/1995 | Hollingsworth et al. | 395/135 |
| 5,444,843 | 8/1995 | Nilsson et al. | 395/161 |
| 5,631,825 | 5/1997 | van Weele et al. | 364/188 |

FOREIGN PATENT DOCUMENTS 63-52209  3/1988  Japan .

OTHER PUBLICATIONS

Smolleck, H, et al, A Development Package of Interactive Software for Illustrating Power–system Protection Principles in Educational and industry training Programs, *IEEE Transactions on Power Systems*, vol. 10, No. 1, Feb. 1995, cr Apr. 6, 1994, pp. 34–43.

Davis, Chet, "A New View for Power System Engineers", IEEE, Pulp and Pare Industry, 1992 Annual Conference, pp. 32–40.

Ghoshal, et al, "GUI Display Guidelines Drive Winning SCADA Projects", *IEEE Computer Applications in Power magazine*, vol. 7, No. 2 Apr. 1994, pp. 39–42.

Foley, M, et al, "An Object Based Graphical User Interface for Power Systems", *IEEE Transactions on Power Systems*, vol. 8, No. 1, Feb. 1993, pp. 97–104.

Yu, David, et al, "A Graphical User Interface for Design, Simulation and Analysis of Power Plant Electrical Auxiliary Systems", *IEEE Transactions on Energy Conversion*, vol. 9, No. 2, Jun. 1994, cr May 18, 1993, pp.263–269.

(List continued on next page.)

*Primary Examiner*—Mark R. Powell
*Attorney, Agent, or Firm*—Staas & Halsey

[57] ABSTRACT

A request for inputting of, for example, a character string of a retrieval item, is issued to an operator by an input request section of an item processing section via a pattern/character editing section and a display operating section; and a request for specification of a to-be-retrieved pattern is issued to the operator by a specification request section of a pattern specifying section. A retrieval processing section retrieves a data base for the retrieval item obtained in the item processing section and the to-be-retrieved pattern obtained in the pattern specifying section. The retrieval result of the data base by the retrieval processing section is converted into a character string corresponding to data derived as the retrieval result by a character creation section of a writing processing section, arranged in position corresponding to an input retrieval item in the drawing by a character arranging section of the writing processing section, and written into the drawing data.

19 Claims, 17 Drawing Sheets

OTHER PUBLICATIONS

Yu, David, et al, "A PC–Based Interactive Graphical Simulation and Analysis Package for a Power Plant Electrical Auxiliary System", *IEEE transactions on Power Systems*, vol. 5, No. 2, May 1990, pp. 628–634.

Chen, J. S., et al, "A Graphical User Interface Control System at SRRC", *Particle Accelerator*, 1993 Conference, pp. 1878–1880.

Kulseth, C.R., et al, "User Interface Issues for Evolving Open Systems", *IEEE Transactions on Power Systems*, vol. 8, No. 3, Aug. 1993, pp. 1039–1044.

D'Amour, P., et al, "Modern User Interface Revolutionizes Supervisory Systems", *IEEE Applications in Power*, Jan. 1994, pp. 34–39.

Pahalawaththa, N., et al, "A Power System CAD Package for the Workstation and Personal Computer Environment", *IEEE Transactions on Power Systems*, vol. 6, No. 1, Feb. 1991, pp. 400–406.

Chen, Sherman, "Interactive graphical Interface for power System Network Analysis", *IEEE Computer Applications in Power Magazine*, vol. 3, No. 1, Jan. 1990, pp. 34–38.

Pande, et al, "An Expert System for Automatic Extraction of Machine Features and Tooling Selection for Automats", *Computer–Aided Engineering Journal*, Aug. 1990, vol. 7, iss. 4, pp. 99–103.

Harbater, et al, "A CAD–Based Electronics Design Rule Checker to Improve System Reliability", *Reliability& Maintainability*, 1990 Symposium, pp. 441–449.

Baudin, Catherine et al, "Recovering Rational Design Changes: A Knowledge–Based Approach," *System, Man, and Cybernetics*, 1990 International Conference, pp. 745–748.

Lieberman, Henry, "Graphic Annotation as a Visual Language for Specifying Generalization Relations," *Visual Languages*, 1993 IEEE Symposium, pp. 19–24.

Yand, DerShung, et al, "An Intelligent Symbol Usage Assistant for CAD Systems," *IEEE Expert Magazine*, vol. 9, Iss. 3, Jun. 1994, pp. 32–40.

DRAWING OF RETRIEVAL RESULT

F I G. 7
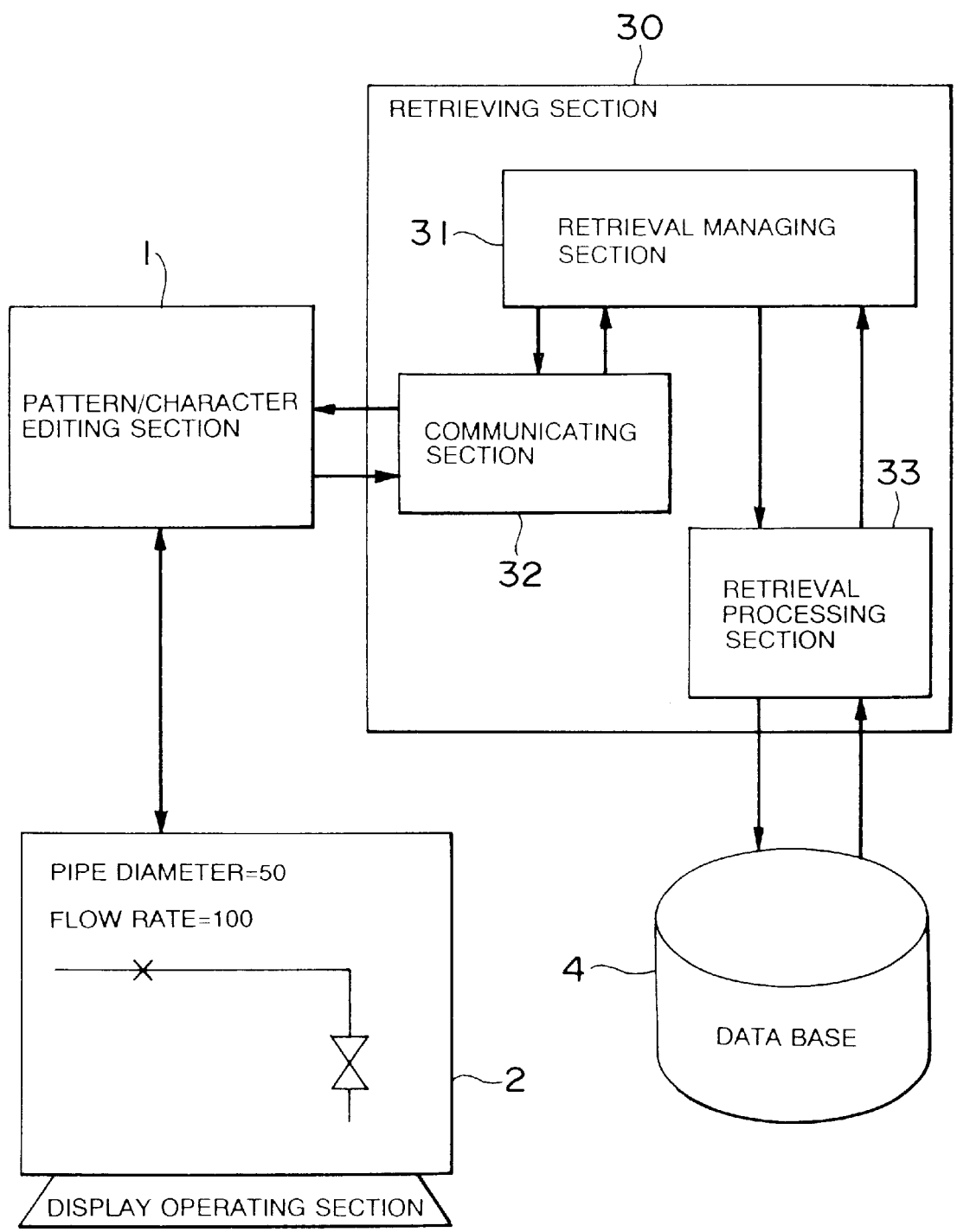

METHOD AND APPARATUS FOR REFERRING TO RELATED INFORMATION IN DRAWING PROCESSING SYSTEM

This application is a continuation, of application Ser. No. 08/323,349, filed Oct. 14, 1994, now abandoned.

BACKGROUND OF THE INVENTION

1. Field of the Invention

This invention relates to a drawing processing system such as a CAD (computer-aided design) system for processing a drawing represented in a drawing data form, and more particularly to a method and apparatus for referring to related information for retrieving information related to the drawing and stored in a data base from the data base and for entering the same into the drawing so as to refer the information related to the drawing in the drawing processing system.

2. Description of the Related Art

For example, a plant drawing, such as a piping and instrument diagram; process flow diagram; and piping diagram of the plant, is a logical drawing drawn by use of lines indicating pipelines, symbols indicating instruments, and characters indicating applications and management numbers.

In recent years, in the industrial fields which have large-scale plants of petroleum, petrochemistry and nuclear power generation and in which safety is required, a large number of plants and a large number of instruments are used. Therefore, the number of drawings used for displaying the structures thereof, the amount of measurement data related to the drawings and the amount of instrument specification data become extremely large. As a result, there occurs a possibility that time required for detecting the abnormal state of the plant becomes long and the reliability thereof is lowered.

Therefore, under this condition, it is necessary to reduce the time required for detecting the abnormal state of the plant and enhance the reliability thereof. For this purpose, it is desired to represent the drawing data in an electronic data form by use of the CAD system, combine the drawing data with related data such as measurement data or instrument specification data which is conventionally available, and manage them in a united form in order to reduce the time required for detecting the abnormal state of the plant and enhance the reliability thereof.

The plant drawing, such as a piping and instrument diagram; process flow diagram; and piping diagram of the plant encoded by use of lines, symbols, and characters, is converted into pattern data or CAD data by forming and editing the same by the CAD system. Conventionally, a data base, in which information such as measurement data or instrument specification data related to the piping and plant instrument is stored, is provided for the plant. In most cases, the above information must be substantially closely related to the plant drawing. Specifically, such information contains measurement information of pressure, temperature and the like and instrument specification information of the pipe diameter, pipe length and the like of the pipeline.

Conventionally, when measurement data, instrument specification data and the like are retrieved in connection with the drawing represented in a CAD data form, a computer system capable of effecting the multiwindow process for simultaneously opening windows of a plurality of different applications or a so-called multiwindow system is used to effect the following processes.

That is, the drawing window of the CAD system representing the drawing of CAD data and the information retrieving window of the data base system for retrieving numerical data of measurement data and character data of the instrument specification are simultaneously opened. By this operation, information related to the drawing can be retrieved in the information retrieving window with the drawing of CAD data displayed in the drawing window.

A concrete example of the display plane in the operation of retrieving drawing related information in the above-described conventional system is schematically shown in FIGS. 1 to 5.

In order to retrieve the measurement data and instrument specification data related to the drawing, a retrieval item window W2 for selecting the retrieval item is opened with a drawing window W1 of the CAD system opened as shown in FIG. 1. The retrieval items such as temperature, flow rate, pressure and pipe diameter are displayed in the retrieval item window W2.

Suppose now that the operator operates an instruction input device such as a mouse to select and specify the flow rate and pipe diameter from the retrieval items of the retrieval item window W2 as shown in FIG. 2, for example.

Further, if the operator operates the mouse to select and specify a drawing element such as a pipeline or plant instrument as indicated by "x" in FIG. 3, the retrieval item specified in the retrieval item window W2 for the specified drawing element or object pattern, that is, the flow rate and pipe diameter are used as retrieval keys to retrieve the measurement data and instrument specification data from the data base ("x" simply indicates the specified position of the drawing element by the mouse cursor or the like and such a mark is not always displayed on the pattern of the image plane).

If the retrieval result can be obtained by the above retrieving operation, a retrieval result window W3 is further opened as shown in FIG. 4, and the values of the flow rate and pipe diameter for the object pattern (the pipe indicated by "x" in FIG. 3) are displayed as "FLOW RATE=100" and "PIPE DIAMETER=50", for example, in the retrieval result window W3.

When a hard copy of the image plane on which the drawing is displayed is used as an output of the retrieval result and if the retrieval item window W2 and retrieval result window W3 are output on the hard copy of the image plane of the drawing window W2, the image becomes difficult to clearly observe. Therefore, in such a case, the operator is required to set the retrieval keys to correspond to the retrieval results in position near the object pattern of the drawing window W1, manually input characters of "FLOW RATE=100" and "PIPE DIAMETER=50", clear the retrieval item window W2 and retrieval result window W3 from the image plane, and then output the hard copy.

In the above example, the retrieval window is constructed by the two windows, that is, the retrieval item window W2 and the retrieval result window W3.

However, the retrieving/entering operation of drawing related information in the above conventional system has the following problems.

(1) Overlapping of Windows

For example, when the retrieval item window W2 and retrieval result window W3 are displayed on the drawing window W1 of the CAD on the image plane as shown in FIG. 4, part of the drawing displayed on the drawing window W1 is covered with the retrieval result window W3 and cannot be observed. In FIG. 4, a specified portion of the object pattern is covered with the retrieval result window W3 and cannot be observed. In such a case, it is only required to change the display position of the retrieval result window W3, but a complicated operation must be effected to change the display position of the window and it is sometimes impossible to change the display position of the window due to the limitation of the physical positional relation.

(2) Retrieving Object Pattern

The operator who has effected the retrieval operation of drawing related information can easily determine the pipe or instrument corresponding to the retrieving object pattern, but it is sometimes difficult for the third party to determine the same. Particularly, when the hard copy of the image plane is utilized as the output of the retrieval result, the retrieval key and the retrieval result are set to correspond to each other and characters are written on the image plane of the drawing window W1 as shown in FIG. 5. At this time, when the retrieval item window W2 or retrieval result window W3 is displayed on or near the object pattern, the characters must be input into an adequate position after the retrieval item window or retrieval result window is moved. Further, after this, the retrieval item window W2 and retrieval result window W3 are cleared from the image plane and then the hard copy of the image plane is obtained. In this case, the operation is extremely troublesome.

(3) Possibility of Erroneous Input

The operator creates the retrieval result on the drawing window W1 as a character string to reflect the retrieval result on the hard copy of the drawing, but at this time, there occurs a possibility that the retrieval result is erroneously input.

SUMMARY OF THE INVENTION

An object of this invention is to provide a method and apparatus for referring to related information in a drawing processing system capable of retrieving information related to a drawing constructed by drawing data and reflecting the retrieval result in an adequate position on the drawing data in an adequate form.

A method for referring to related information in a drawing processing system according to a first aspect of this invention comprises an item inputting step of inputting a retrieval item related to a drawing represented in a drawing data form into a desired portion in the drawing on an image plane on which the drawing is displayed; a pattern specifying step of specifying and inputting an object pattern to be retrieved according to the retrieval item; a retrieval processing step of retrieving a data base related to the drawing data based on information of the object pattern and retrieval item input; and a writing step of writing the retrieval result retrieved from the data base into the drawing data in position corresponding to the retrieval item in the drawing.

The item inputting step may include an input request step of suggesting to the operator that the character string of the retrieval item should be input into the drawing, and a retrieval item extracting step of extracting the character string of the retrieval item input into the drawing from the drawing data.

The pattern specifying step may include a specification request step of suggesting to the operator that an object-pattern in the drawing to be retrieved for the retrieval item should be specified and input, and a pattern extracting step of extracting an identifier of the pattern and the classification of the pattern for the object pattern specified in the drawing.

The retrieval processing step may be a step of retrieving the data base related to the drawing data and deriving drawing related data corresponding to the identifier and classification of the specified object pattern and input retrieval item.

The writing step may include a character creation step of creating a data character string corresponding to the retrieval result retrieved from the data base, and a character arranging step of arranging the created data character string in position corresponding to the retrieval item in the drawing and writing the same into the drawing data.

The character arranging step may include a step of setting the character attribute of the data character string to correspond to the character attribute of the retrieval item in the drawing.

The drawing data may be plant drawing data represented in a CAD data form and the retrieval item may include at least one of the measurement data and instrument specification data in the plant.

An apparatus for referring to related information in a drawing processing system according to a second aspect of this invention comprises pattern/character editing means for editing patterns and characters constituting a drawing represented in a drawing data form; data base means for storing drawing related information related to the drawing represented in the drawing data form; item processing means for inputting a retrieval item related to the drawing represented in the drawing data form into a desired portion of the drawing on an image plane on which the drawing is displayed via the pattern/character editing means; pattern specifying means for specifying and inputting an object pattern to be retrieved for the retrieval item via the pattern/character editing means; retrieval processing means for retrieving the data base based on information of the retrieval item and object pattern and deriving data related to drawing data; and writing processing means for writing the retrieval result retrieved from the data base means by the retrieval processing means into the drawing data in position corresponding to the retrieval item in the drawing via the pattern/character editing means.

The item processing means may include input request means for suggesting to the operator that the character string of the retrieval item should be input into the drawing via the pattern/character editing means, and retrieval item extracting means for extracting the character string of the retrieval item input into the drawing from the drawing data.

The pattern specifying means may include specification request means for suggesting to the operator that an object pattern in the drawing to be retrieved for the retrieval item should be specified and input via the pattern/character editing means, and pattern extracting means for extracting an identifier of the pattern and the classification of the pattern for the object pattern specified in the drawing.

The retrieval processing means may include means for retrieving the data base means and deriving drawing related data corresponding to the identifier and classification of the specified object pattern and input retrieval item.

The writing processing means may include character creation means for creating a data character string corresponding to the retrieval result retrieved from the data base means, and character arranging means for arranging the created data character string in position corresponding to the retrieval item in the drawing and writing the same into the drawing data.

The character arranging means may include means for setting the character attribute of the data character string to correspond to the character attribute of the retrieval item in the drawing.

An apparatus for referring to related information in a drawing processing system according to a third aspect of this invention comprises pattern/character editing means for editing patterns and characters constituting a drawing represented in a drawing data form; data base means for storing drawing related information related to the drawing represented in the drawing data form; communicating means for transferring information containing a control instruction with respect to the pattern/character editing means; retrieval processing means for extracting the retrieval of the data base means and the retrieval result thereof; and retrieval management means for inputting the retrieval item related to the drawing represented in the drawing data form into a desired portion of the drawing on an image plane on which the drawing is displayed via the communicating means by use of the pattern/character editing means, specifying and inputting an object pattern to be retrieved for the retrieval item on the image plane, retrieving the data base means via the retrieval processing means based on the object pattern and retrieval item obtained as the result of the above operation to derive corresponding data, supplying the data to the pattern/character editing means via the communicating means, and writing the data into the drawing data in position corresponding to the retrieval item in the drawing.

The pattern/character editing means may be a general CAD system.

In the method and apparatus for referring to related information in a drawing processing system according to this invention, when a character string indicating the retrieval item is input into the drawing constructed by drawing data via the pattern/character editing section such as a CAD system and an object pattern indicating a component to be retrieved is specified, the retrieval processing section retrieves the data base based on the object pattern and retrieval item and enters retrieval data obtained as the result of retrieval in position corresponding to the input character string indicating the retrieval item in the drawing. Therefore, in the related information referring method and apparatus according to this invention, the retrieval item and retrieval data corresponding to a desired retrieving object pattern can be easily determined without overlapping the retrieval window or the like on the drawing.

Further, in the related information referring method and apparatus according to this invention, since both of the specification of the retrieval item and the specification of the position of the retrieval result can be attained simply by entering the retrieval item into a desired portion of the drawing, that is, into a portion in which it is desired to set the retrieval result, the operation by the operator becomes extremely simple.

Further, in the related information referring method and apparatus according to this invention, since the retrieval item and retrieval data are written into the drawing in a corresponding form, they can be treated as normal information in the drawing after this.

BRIEF DESCRIPTION OF THE DRAWINGS

Other objects and advantages of the invention will become apparent during the following discussion in conjunction with the accompanying drawings, in which:

FIG. 7 is a block diagram showing the construction of a second embodiment of a drawing processing system to which a related information referring system according to this invention is applied;

DETAILED DESCRIPTION OF THE PREFERRED EMBODIMENTS

There will now be described embodiments of a drawing processing system to which a related information referring system according to this invention is applied with reference to the accompanying drawings.

Figure 1:
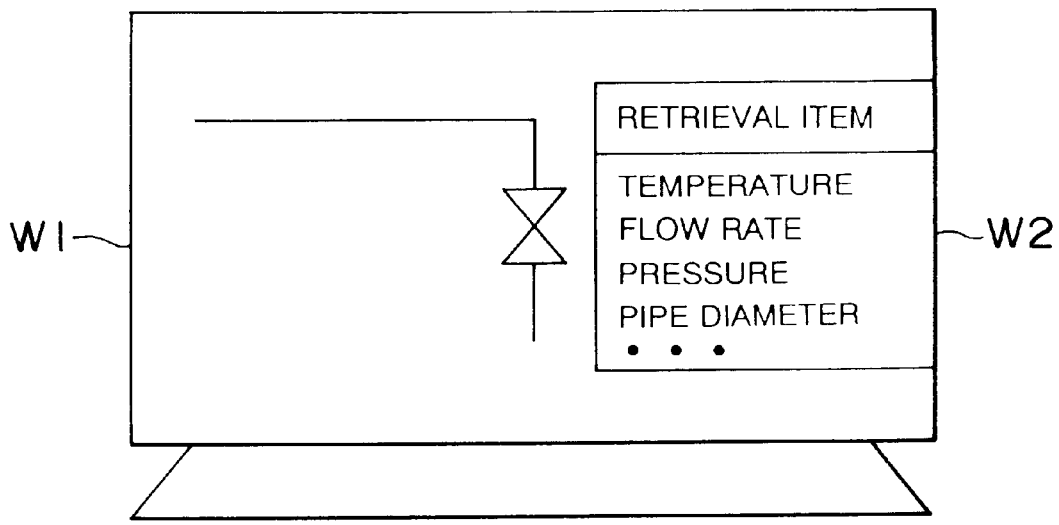
FIG. 1 is a schematic view for illustrating the retrieval and entry of drawing related information in the conventional system.
Figure 2:
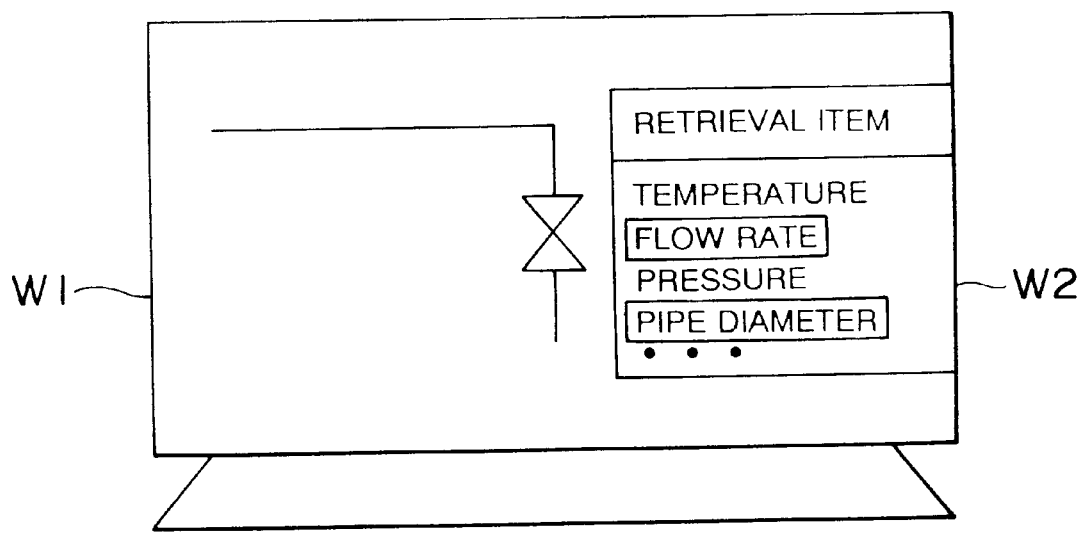
FIG. 2 is a schematic view for illustrating the retrieval and entry of drawing related information in the conventional system.
Figure 3:
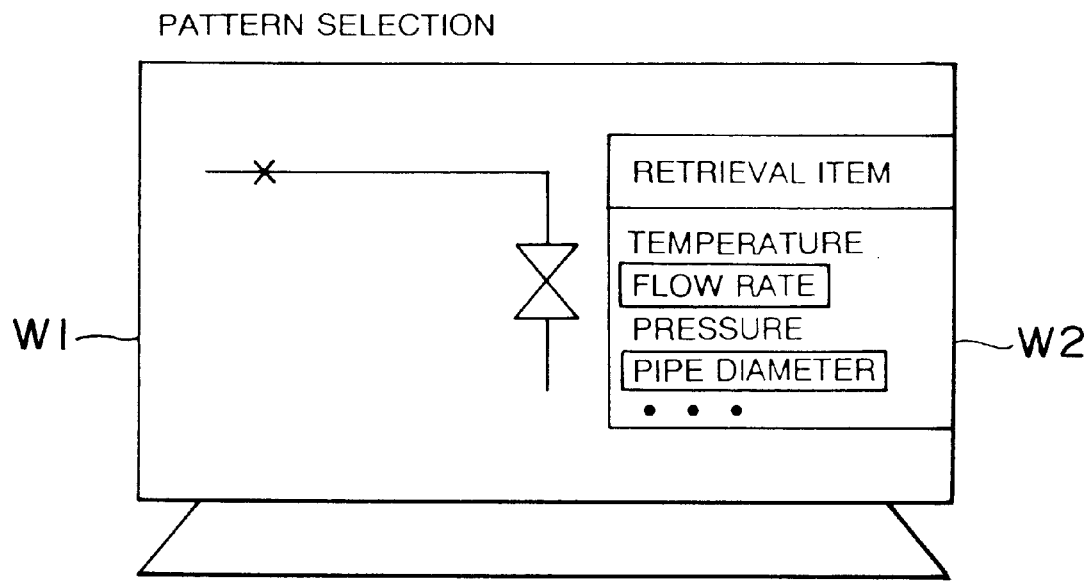
FIG. 3 is a schematic view for illustrating the retrieval and entry of drawing related information in the conventional system.
Figure 4:
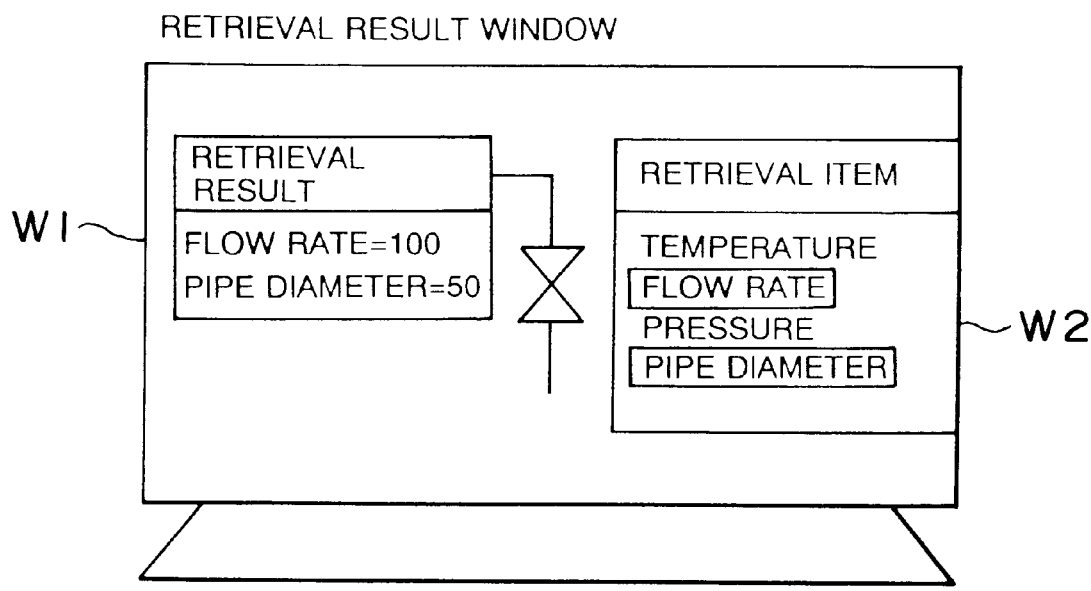
FIG. 4 is a schematic view for illustrating the retrieval and entry of drawing related information in the conventional system.
Figure 5:
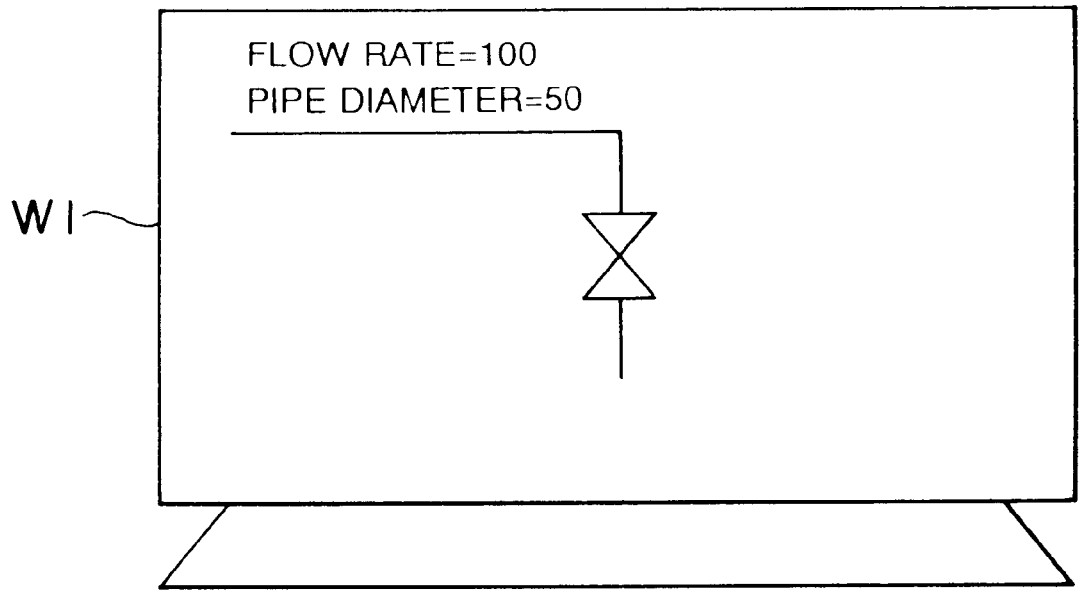
FIG. 5 is a schematic view for illustrating the retrieval and entry of drawing related information in the conventional system.
Figure 6:
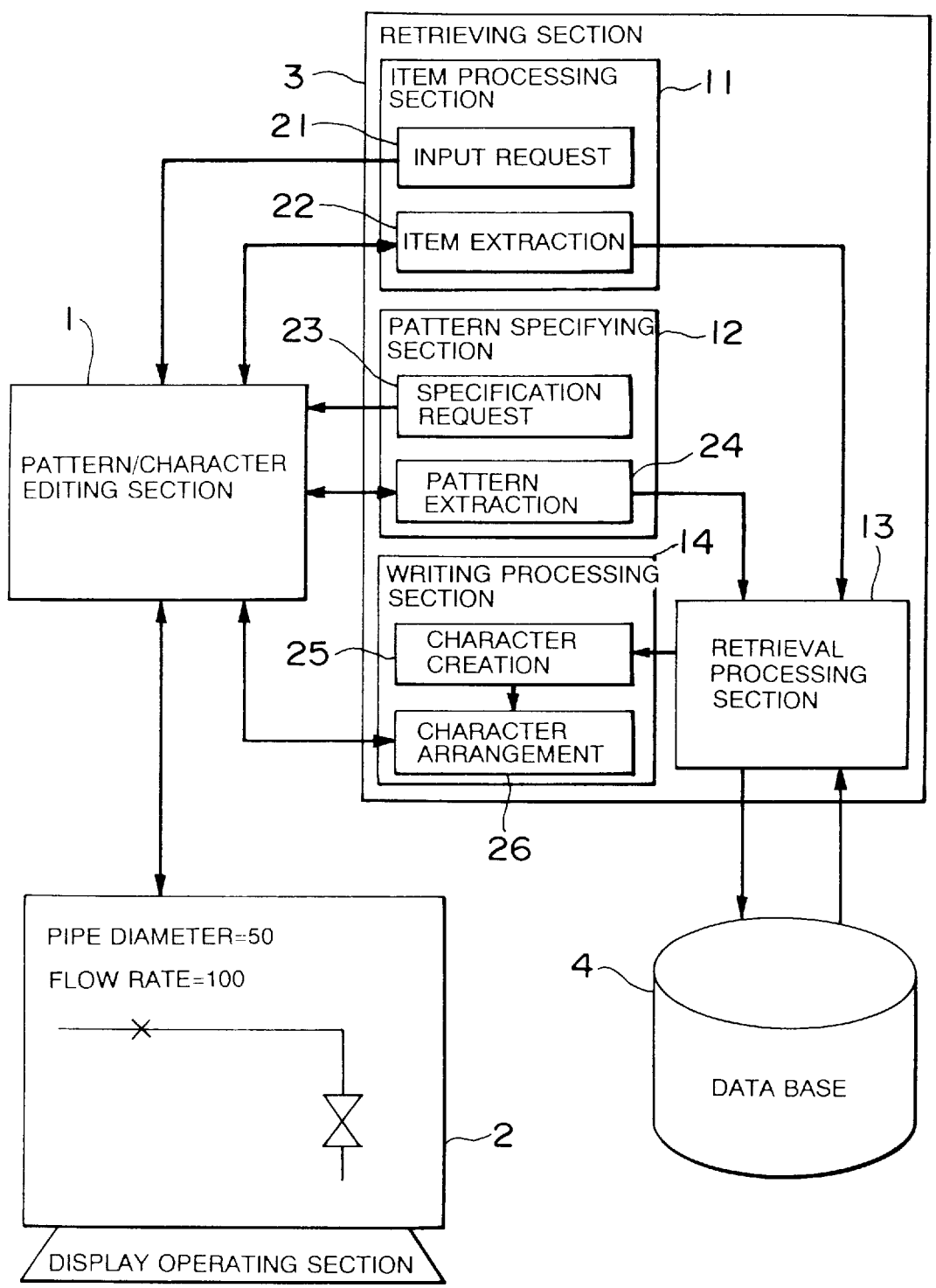
FIG. 6 is a block diagram showing the construction of a first principle embodiment of a drawing processing system to which a related information referring system according to this invention is applied.

The principle construction of a drawing processing system according to a first embodiment of this invention is shown in FIG. 6.

The drawing processing system of FIG. 6 includes a pattern/character editing section 1, display operating section 2, retrieving section 3 and data base 4.

Like a CAD system, for example, the pattern/character editing section 1 edits patterns and characters constituting a drawing represented in a drawing data form. The pattern/character editing section 1 may be a normal CAD system. CAD data, that is, drawing data is stored in a memory device of the pattern/character editing section 1. For example, the display operating section 2 includes a display unit for displaying an image of characters and patterns and an input operation section for inputting characters and coordinate information to effect the input operation for displaying and editing pattern/character data of the pattern/character editing section 1. The display unit is a CRT display or liquid crystal panel, for example, and the input operation section is one of a keyboard, pen input tablet, mouse, digitizer, and the other pointing device or a combination of some of the devices.

The data base 4 stores drawing related information related to the drawing represented in the drawing data form. The drawing related information, stored in the data base 4, is measurement data and instrument specification data of the piping and plant instrument when the drawing is a plant drawing such as a piping and instrument diagram, process flow diagram or piping diagram of the plant. For example, the measurement data is a flow rate, pressure, temperature and the instrument specification data is the pipe diameter and the like. The data base 4 is also not necessarily a special data base, and a general data base system can be used as it is.

The retrieving section 3 includes an item processing section 11, pattern specifying section 12, retrieval processing section 13 and writing processing section 14.

The item processing section 11 includes an input request section 21 and an item extracting section 22. The input request section 21 issues a request for inputting of, for example, a character string of the retrieval item to the operator via the pattern/character editing section 1 and display operating section 2. In this case, the retrieval items are the pipe diameter and the flow rate, for example. The item extracting section 22 extracts retrieval item information input via the pattern/character editing section 1 and display operating section 2 by the operator from the drawing data.

That is, the item processing section 11 permits the retrieval item related to the drawing to be input into a desired portion in the drawing on the image plane of the display operating section 2 on which the drawing is displayed via the pattern/character editing section 1.

The pattern specifying section 12 includes a specification request section 23 and pattern extracting section 24. The specification request section 23 issues a request for specification of a retrieving object pattern to the operator via the pattern/character editing section 1 and display operating section 2. The pattern extracting section 24 extracts retrieving object pattern information specified and input via the pattern/character editing section 1 and display operating section 2 by the operator. For example, the classification of the object pattern (for example, pipeline) and the identifier of the pattern (the identifier specifically indicates one of the pipelines) from the drawing data. The identifier of the pattern is attached to the drawing data as an inherent identifier, which is fixedly determined for each pattern in the system. The system can determine a selected pipeline and a selected symbol or instrument based on the identifier. It is assumed that the pattern/character editing section 1 can retrieve and extract the pattern/character from the retrieval section 3 and create a character string to cooperate with the retrieval section 3 and data base 4.

That is, the pattern specifying section 12 specifies a desired pattern, for example, a pipeline on the image plane of the display operating section 2 on which the drawing is displayed via the pattern/character editing section 1 so as to derive the retrieving object pattern to be retrieved for the retrieval item.

The retrieval processing section 13 retrieves the data base 4 for the retrieving object pattern derived in the pattern specifying section 12 for the retrieval item obtained in the item processing section 11 and derives data of the retrieval items for the retrieving object pattern. For example, data of "the pipe diameter is 50" and "the flow rate is 100" as the retrieval result from the data base 4.

The writing processing section 14 includes a character creating section 25 and a character arranging section 26. The character creating section 25 creates a character string corresponding to data derived as the retrieval result based on the data. The character arranging section 26 arranges the retrieval result character string created in the character creating section 25 in a position corresponding to the retrieval items input in the drawing displayed on the display operating section 2 via the pattern/character editing section 1 and writes the same into the drawing data in a form such that the "PIPE DIAMETER=50" and the "FLOW RATE= 100" as shown in the drawing.

That is, the writing processing section 14 writes the retrieval result for the retrieval items of the retrieving object pattern retrieved from the data base 4 in the retrieval processing section 13 into the drawing data in position corresponding to the retrieval items in the drawing via the pattern/character editing section 1.

The operation of the drawing processing system of FIG. 6 with the above construction is explained below.

First, a request for inputting of a retrieval item, for example, character string is issued to the operator via the pattern/character editing section 1 and display operating section 2 by the input request section 21 of the item processing section 11. A request for specification of a retrieving object pattern is issued to the operator by the specification request section 23 of the pattern specifying section 12. The requests for inputting of the retrieval item and specification of the retrieving object pattern to the operator may be issued irrespective the order thereof. In any case, when the operator issues an instruction of retrieval of drawing related information to the pattern/character editing section 1 via the display operating section 2, the above request is issued.

The retrieval item input by the operator is extracted from the drawing data of the pattern/character editing section 1 by the pattern extracting section 24 of the information item processing section 11. The retrieving object pattern information specified by the operator is extracted from the drawing data of the pattern/character editing section 1 by the pattern extracting section 24 of the pattern specifying section 12.

The retrieval processing section 13 retrieves the data base 4 for the retrieval item obtained by the item processing section 11 and the retrieving object pattern obtained by the pattern specifying section 12.

The result of retrieval of the data base 4 by the retrieval processing section 13 is converted into a character string corresponding to data extracted as the retrieval result by the character creating section 25 of the writing processing section 14, arranged in position corresponding to the retrieval item previously input into the drawing, and written into the drawing data as shown in the drawing.

Therefore, only if the operator inputs the retrieval item in a desired position in the drawing by the pattern/character editing section 1 via the display operating section 2 and specifies a desired pattern in the drawing, the retrieving section 3 retrieves drawing related information from the data base 4 and writes the retrieval result into the drawing data in position corresponding to the retrieval item. For this reason, the retrieval item and retrieval data corresponding to the desired retrieving object pattern can be entered in a desired position without causing the retrieval window or the like to overlap the drawing, and the operation of the operator becomes extremely simple. Further, since the retrieval item and retrieving data are written into the drawing in corresponding forms, they can be treated as normal information in the drawing after this.

In the drawing processing system of FIG. 6, when a character string indicating the retrieval item is input into the drawing constructed by drawing data and an object pattern indicating components to be retrieved is specified via the pattern/character editing section 1 such as a CAD system, the retrieving section 13 retrieves the data base 4 for the object pattern and retrieval item and retrieval data obtained as the retrieval result is entered in position corresponding to the character string indicating the previously input retrieval item in the drawing so that the retrieval item and retrieval data corresponding to a desired retrieving object pattern can be easily determined without causing the retrieval window or the like to overlap the drawing.

A drawing processing system according to a second embodiment of this invention is shown in FIG. 7.

The system of the second embodiment of FIG. 7 is obtained by more concretely constructing the system of the first embodiment of FIG. 6. In FIG. 7, portions, which are the same as those of FIG. 6, are denoted by the same reference numerals and the detailed explanation therefor is omitted.

In this case, a retrieving section 30 includes a retrieval managing section 31, communicating section 32 and retrieval processing section 33 and has a function substantially corresponding to that of the retrieving section 3 of FIG. 6.

The communicating section 32 transfers character strings, patterns and information containing control instruction and position information with respect to the pattern/character editing section 1. More specifically, the communicating section 32 issues a pattern retrieving request, a character string creating request and the like to the pattern/character editing section 1. The retrieval processing section 33 corresponds to the retrieval processing section 13 of FIG. 6, and retrieves the data base 4 and extracts the retrieval result from the data base 4. That is, the retrieval section 33 retrieves measurement data and instrument specification data from the data base 4 and returns the retrieval result to the retrieval managing section 31 when supplied with the retrieval item name, pattern classification and identifier attached to the pattern from the retrieval managing section 31.

The retrieval managing section 31 is a portion for managing substantially the entire operation of the retrieving section 30. The retrieval managing section 31 controls the pattern/character editing section 1 via the communicating section 32 so as to input a retrieval item related to the drawing into desired portion of the drawing on the image plane on which the drawing is displayed and specify and input an object pattern to be retrieved for the retrieval item on the image plane, then retrieves the data base 4 via the retrieval processing section 33 for the retrieval item and object pattern obtained as the result of the above operation so as to derive corresponding data, supplies the data to the pattern/character editing section 1 via the communicating section 32 and writes the same into the drawing data in position corresponding to the retrieval item in the drawing.

The above construction can be attained as a combination of functions by a software by use of a computer, but can also be made by constructing each block in a hardware form and combining the hardware blocks.

Figure 8:
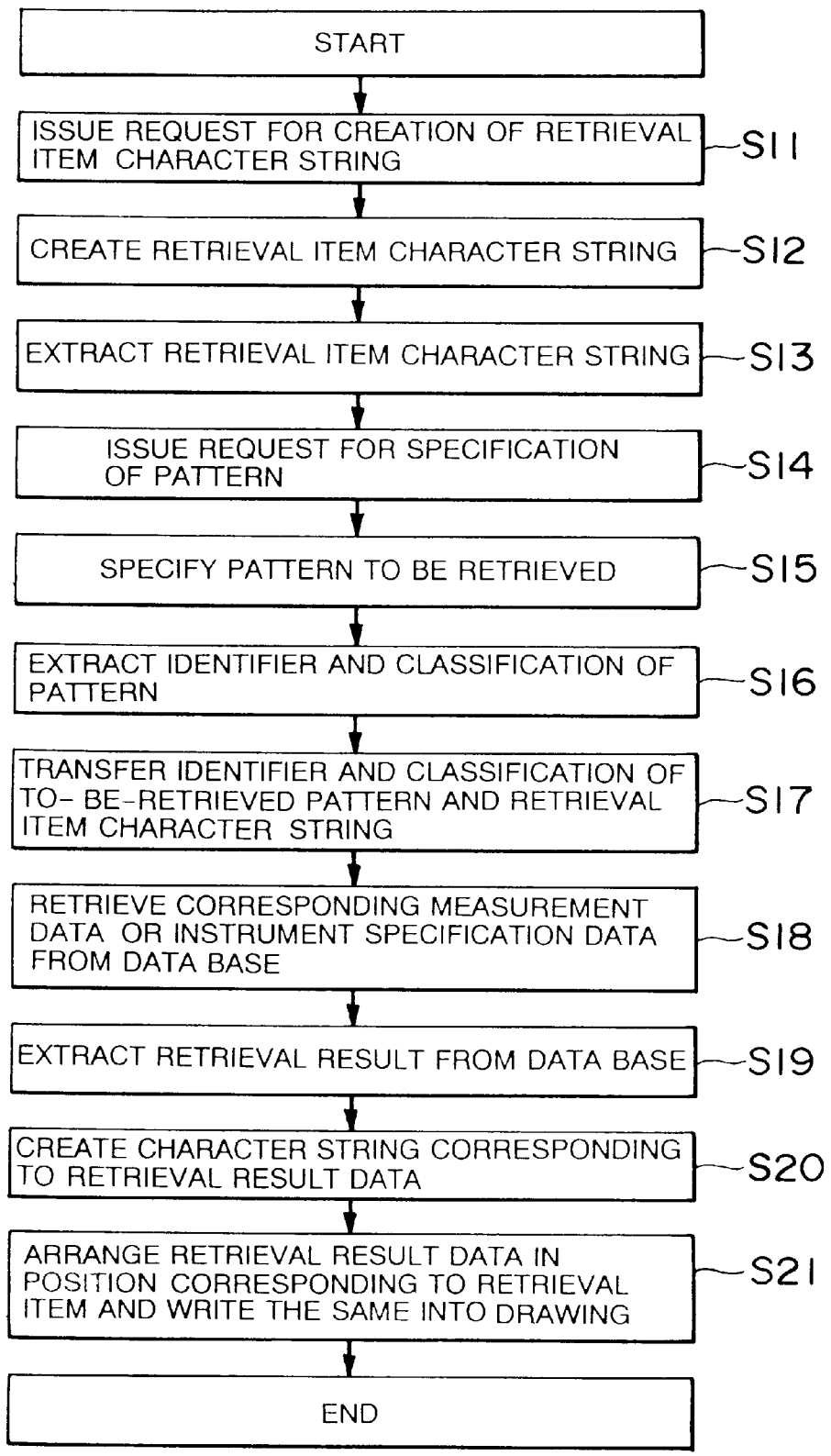
FIG. 8 is a flowchart showing the flow of the process of the drawing processing system of FIG. 7.

The flowchart of the operation of a drawing processing system with such a construction is shown in FIG. 8.

Suppose that, in the pattern/character editing section 1, drawing data such as plant drawing data which is previously created is stored and the drawing is displayed on the display operating section 2. The drawing data is previously created by the pattern/character editing section 1 via the display operating section 2 and stored therein, or created by another system and set into the pattern/character editing section 1.

Specifically, the drawing data may be created as follows, for example.

Figure 9:
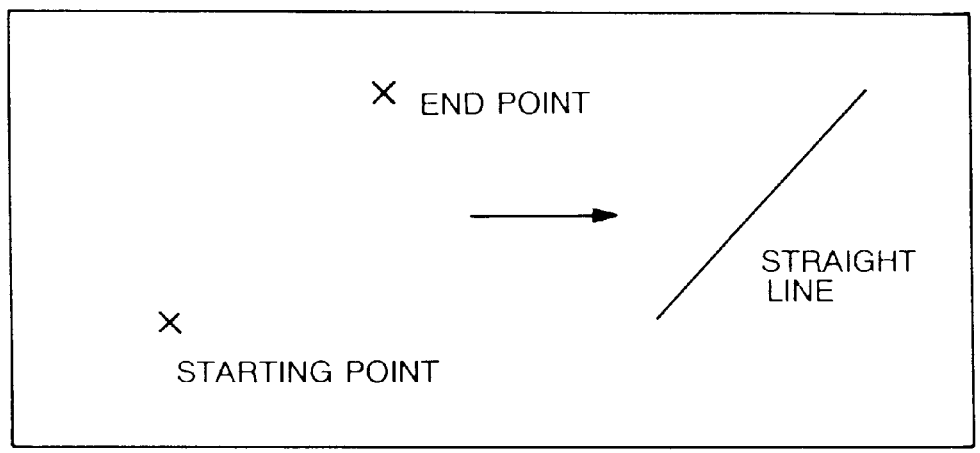
FIG. 9 is a schematic diagram showing an example of pattern data creation, for illustrating the operation of the drawing processing system of FIG. 7.
Figure 10:
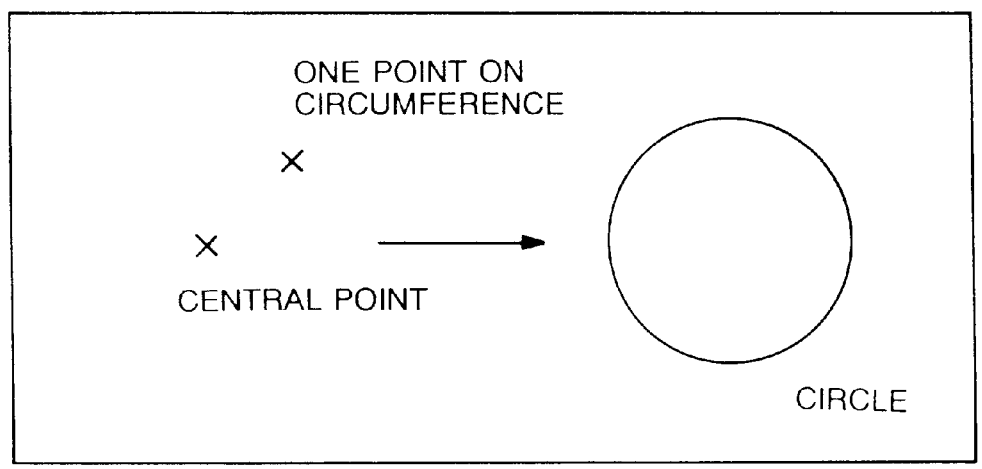
FIG. 10 is a schematic diagram showing an example of pattern data creation, for illustrating the operation of the drawing processing system of FIG. 7.
Figure 11:
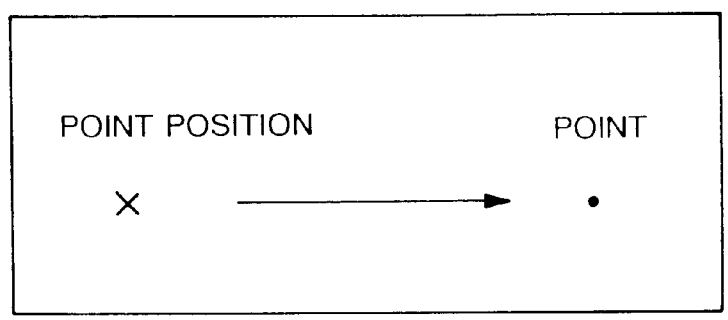
FIG. 11 is a schematic diagram showing an example of pattern data creation, for illustrating the operation of the drawing processing system of FIG. 7.
Figure 12:
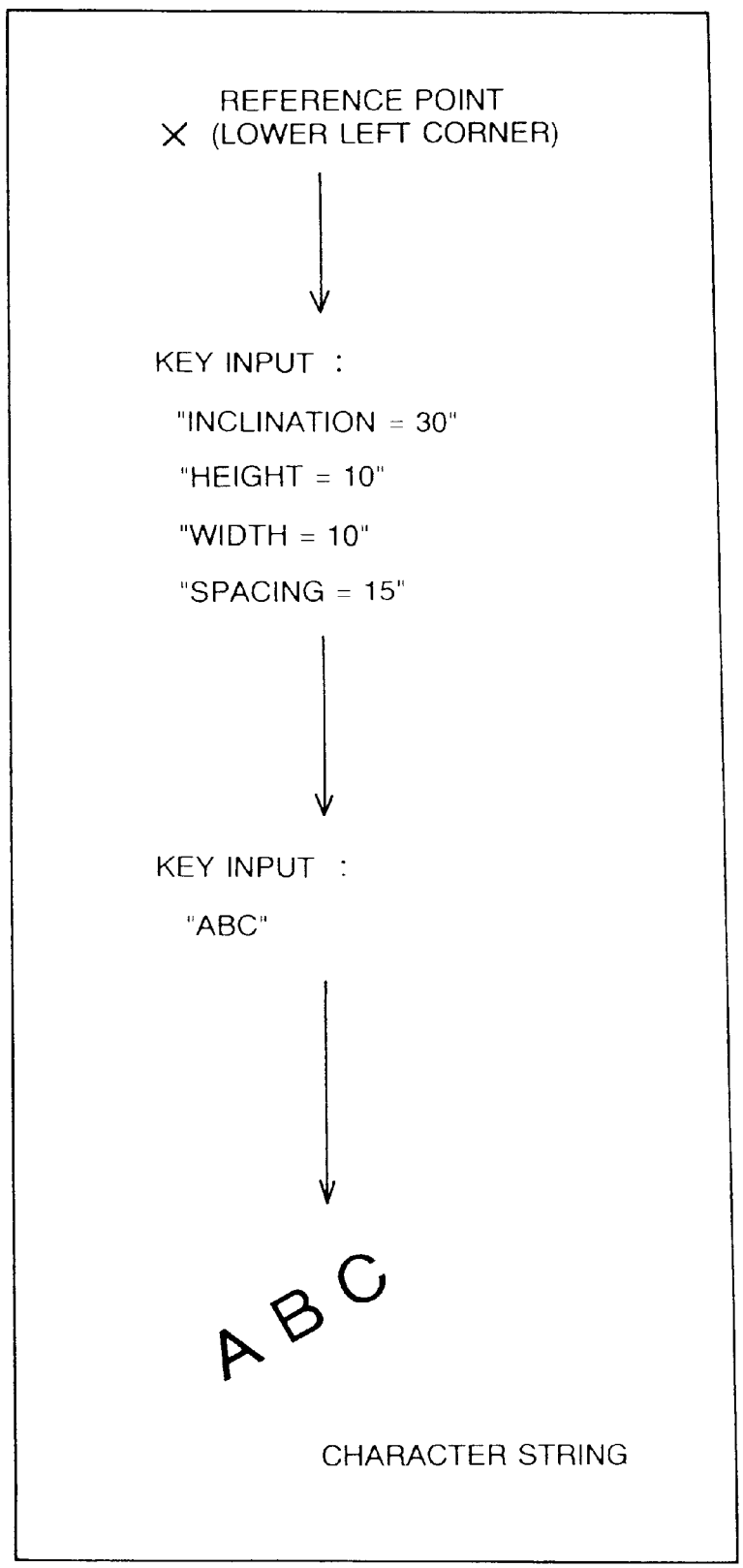
FIG. 12 is a schematic diagram showing an example of pattern data creation, for illustrating the operation of the drawing processing system of FIG. 7.

A straight line can be created by specifying the starting point and end point on the image plane by use of the mouse as shown in FIG. 9. A circle can be created by specifying the central point and a point on the circumference on the image plane by use of the mouse as shown in FIG. 10. A point can be created by specifying a point on the image plane by use of the mouse as shown in FIG. 11. A character string can be created by specifying a reference point (for example, a point on the lower left corner) of the character string on the image plane, inputting the height h (for example, 10 mm), width w (for example, 10 mm), spacing s (for example, 15 mm) and inclination a of the character string (for example, 300) by use of the keyboard, and then inputting a character string ("ABC" in the example shown in the drawing) by use of the keyboard as shown in FIG. 12 (refer to FIG. 17 for the height h, width w, spacing s and inclination a of the character string).

The above operations are combined to create drawing data of a plant drawing or the like. Of course, the drawing creating operation described above is only an example, and various other drawing creating operations are provided in most of the systems.

Drawing data is constructed by a data table of a plurality of pattern elements thus created.

Figure 13:
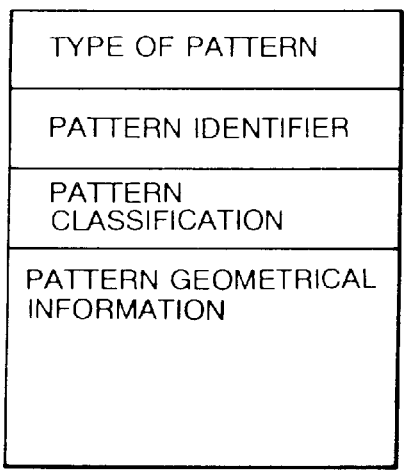
FIG. 13 is a schematic diagram showing the construction of a pattern data table, for illustrating the operation of the drawing processing system of FIG. 7.

The pattern data table constructing the pattern data is specifically explained below. The pattern data table is constructed by the type of a pattern, identifier of the pattern, classification of the pattern and geometrical information of the pattern as shown in FIG. 13. The type of the pattern is information indicating the type of the pattern such as a point, line, circle, arc, kinked line, and character string. The identifier of the pattern is fixedly and inherently given to each pattern data and may be automatically attached by the system or attached on the responsibility of the user. The classification of the pattern is information mainly indicating the classification of application such as a pipeline, and separately indicates the pipeline or symbol, for example. The classification of the pattern corresponds to the layer of drawing data in the normal CAD system. The geometrical information of the pattern is information indicating the geometrical characteristic amount such as a coordinate position or diameter for defining a pattern.

Figure 14:
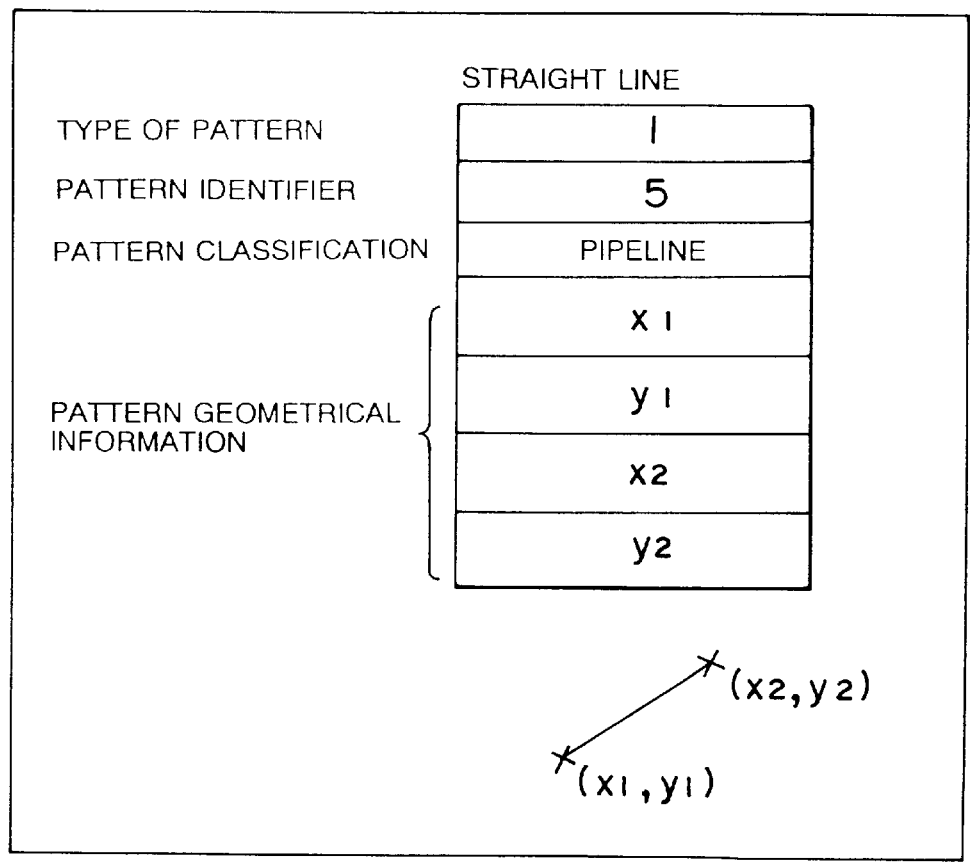
FIG. 14 is a schematic diagram showing the construction of an example of a pattern data table, for illustrating the operation of the drawing processing system of FIG. 7.

For example, FIG. 14 indicates an example of the pattern data table of a straight line, and in this case, a straight line indicating a pipeline (refer to the classification of a pattern) is shown. The straight line is defined by the coordinate values (x1, y1) and (x2, y2) of the starting point and end point, for example.

Figure 15:
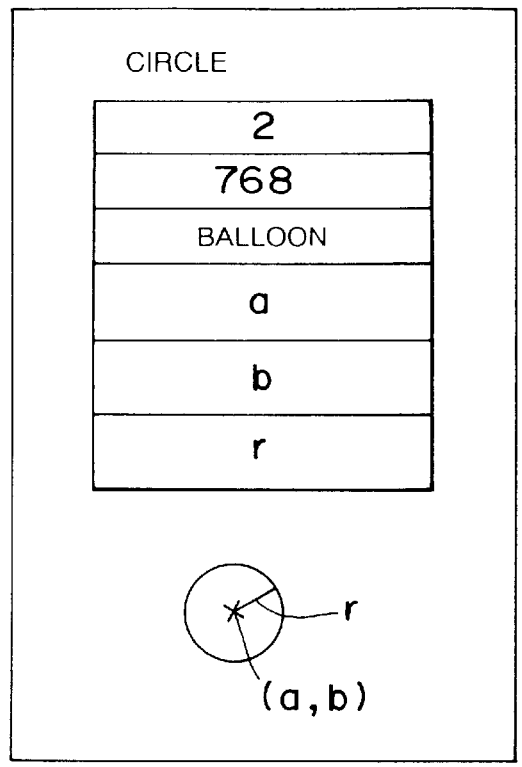
FIG. 15 is a schematic diagram showing the construction of an example of a pattern data table, for illustrating the operation of the drawing processing system of FIG. 7.

FIG. 15 indicates an example of the pattern data table of a circle, and in this case, a circle indicating a balloon (which is a circular symbol in the case of the plant drawing) is shown. The circle is defined by the coordinate value (a, b) of the central point and information r indicating the length of the radius, for example.

Figure 16:
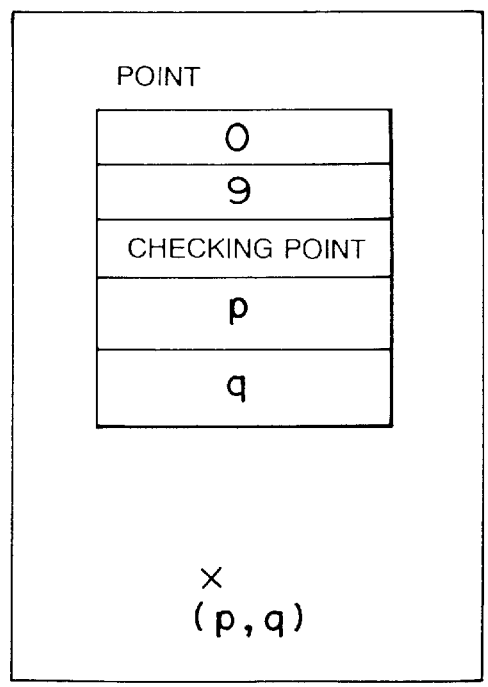
FIG. 16 is a schematic diagram showing the construction of an example of a pattern data table, for illustrating the operation of the drawing processing system of FIG. 7.

FIG. 16 indicates an example of the pattern data table of a point, and in this case, a point indicating a checking point is shown. The point is simply defined by one coordinate values (p, q), for example.

Figure 17:
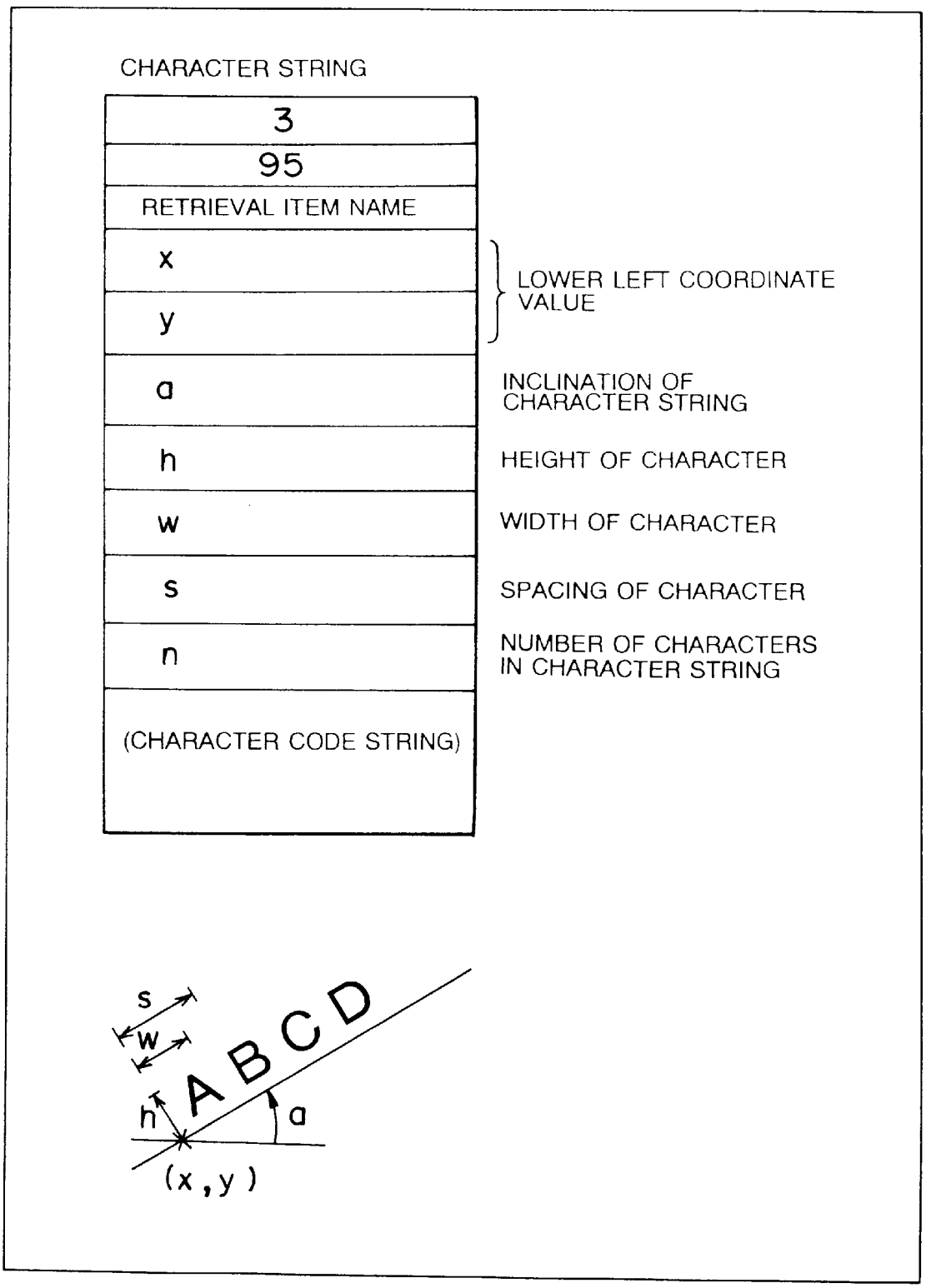
FIG. 17 is a schematic diagram showing the construction of an example of a pattern data table, for illustrating the operation of the drawing processing system of FIG. 7.

FIG. 17 indicates an example of the pattern data table of a character string, and in this case, a character string indicating the name of checking item is shown. The character string is defined by the coordinate values (x, y) of the lower left corner, inclination a of the character string, height h of the character, width w of the character, spacing s of the character, the number n of characters constructing the character string and a character code string constructing the character string, for example.

The flow of the process is explained with reference to FIG. 8.

The process is started by specifying the retrieval of drawing related information by inputting of a preset command or selection of a command from the command menu via the display operating section 2 and pattern/character editing section 1 by the operator, for example.

When the process is started, the retrieval managing section 31 first issues a request for creation of a character string of the retrieval item to the pattern/character editing section 1 via the communicating section 32 (step S11). If the operator operates the display operating section 2 according to the request, the character string of the retrieval item is created (step S12). That is, as shown by the display content D1 of FIG. 18, the display operating section 2 displays a drawing and the operator inputs retrieval items such as "PIPE DIAMETER=" and "FLOW RATE=" as indicated by the display content D2 of FIG. 18 in adequate positions in the drawing. The retrieval managing section 2 fetches the retrieval item character string created in the pattern/character editing section 1 together with the attribute information such as the number of characters constructing the character string, height, width, spacing and inclination from the pattern/character editing section 1 via the communicating section 32 (step S13).

Figure 19:
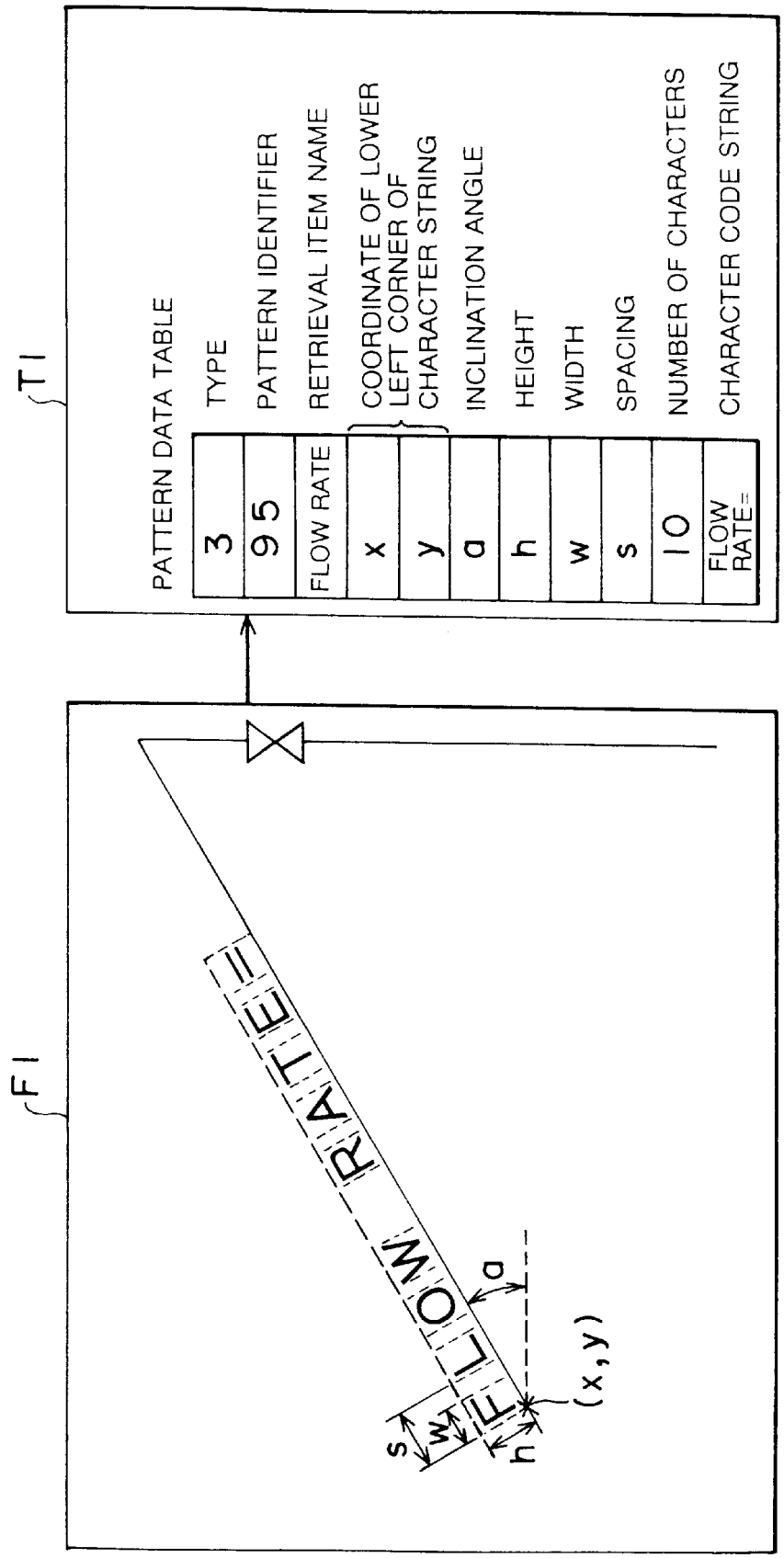
FIG. 19 is a schematic diagram showing an example of item extraction, for illustrating the operation of the drawing processing system of FIG. 7.

That is, as shown in FIG. 19, when a character string of "FLOW RATE=" as the retrieval item is input and the drawing F1 is displayed on the display operating section 2, the pattern data table T1 of the character string of "FLOW RATE=" is extracted by item extraction of the step S13.

Next, the retrieval managing section 31 issues a request for specification of a retrieving object pattern to the pattern/character editing section 1 via the communicating section 32 (step S14). If the operator operates the display operating section 2 according to the request, the retrieving object pattern is selected and specified as indicated by the display content D3 of FIG. 18 in the pattern/character editing section 1 (step S15). The retrieval managing section 2 fetches the classification of the retrieving object pattern and the identifier of the pattern thus specified in the pattern/character editing section 1 from the pattern/character editing section 1 via the communicating section 32 (step S16).

Figure 20:
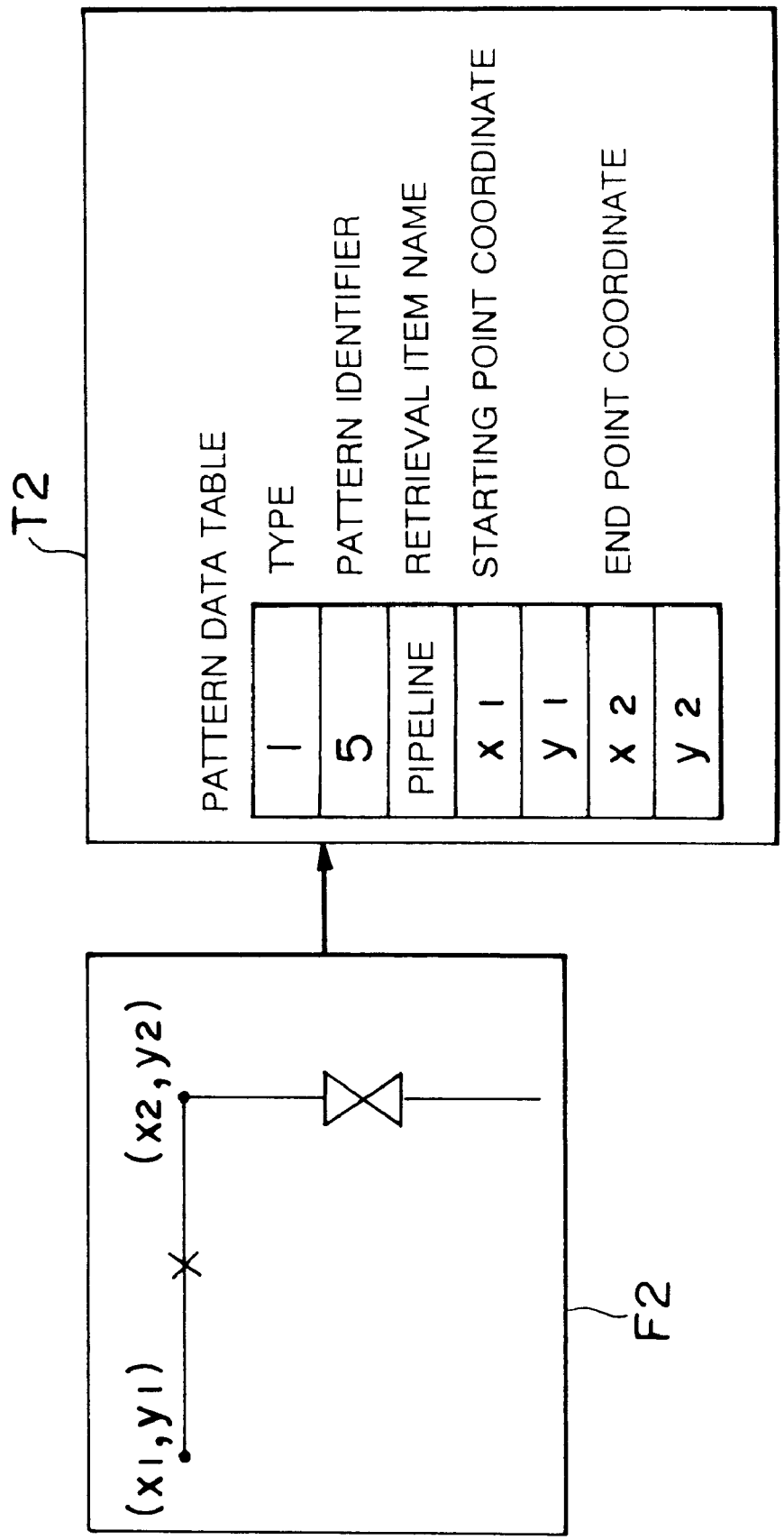
FIG. 20 is a schematic diagram showing an example of pattern extraction, for illustrating the operation of the drawing processing system of FIG. 7.

That is, as shown in FIG. 20, when the drawing F2 is displayed on the display operating section 2 and a straight line (x1, y1)—(x2, y2) indicating a pipe as an object pattern is specified ("x" in the drawing), a pattern data table T2 of the pipeline indicated by the straight line (x1, y1)—(x2, y2) is extracted by pattern extraction of the step S16.

Next, the retrieval managing section 31 gives a character string of the retrieval item obtained in the step S13 and a pattern identifier obtained in the step S16, for example, "5" and the classification thereof, for example, "PIPELINE" to the retrieval processing section 33 (step S17). The retrieval processing section 33 effects the retrieval for the data base 4 (step S18) to derive the retrieval result from the data base 4 (step S19).

Figure 21:
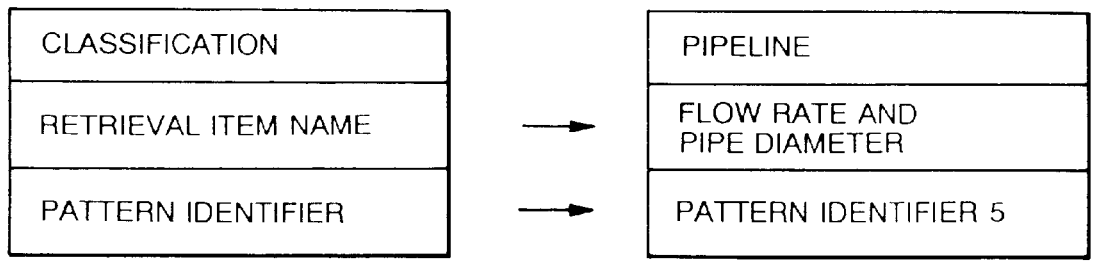
FIG. 21 is a schematic diagram showing an example of the data structure of retrieval request data, for illustrating the operation of the drawing processing system of FIG. 7.

The data structure, at the time of retrieval request to the data base 4 by the retrieval managing section 31 and retrieval processing section 33, is constructed by the classification (for example, "PIPELINE"), retrieval item name (for example, "FLOW RATE" and "PIPE DIAMETER") and pattern identifier (for example, "5") as shown in FIG. 21.

Figure 22:
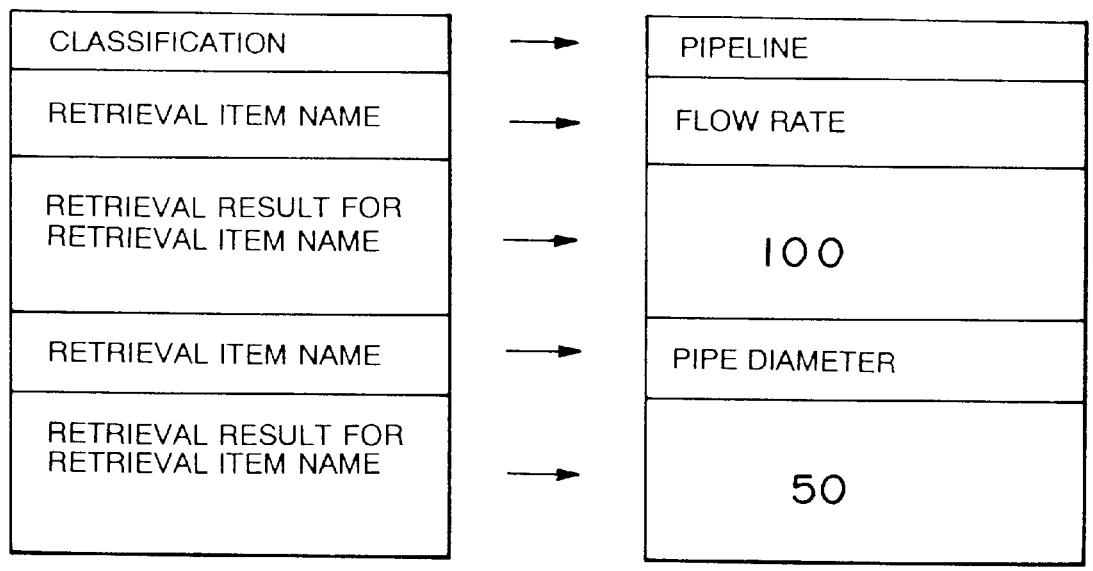
FIG. 22 is a schematic diagram showing an example of the data structure of retrieval result informing parameters, for illustrating the operation of the drawing processing system of FIG. 7.

Then, the data structure of retrieval result informing parameter, obtained in the retrieval processing section 33 by the retrieval of the data base 4, is constructed by the classification (for example, "PIPELINE"), retrieval item name (for example, "FLOW RATE"), the retrieval result thereof (for example, "100"), retrieval item name (for example, "PIPE DIAMETER") and the retrieval result thereof (for example, "50") as shown in FIG. 22.

If the retrieval result is thus returned to the retrieval managing section 31, the retrieval managing section 31 creates character string data of the retrieval result of instrument specification data and measurement data (step S20). At this time, the reference position of the character string is set at the last position of the character string created in the step S12 and the attributes such as the height, width, spacing and inclination are set to correspond to the values obtained in the step S13. The retrieval managing section 31 supplies the character string information thus created to the pattern/character editing section 1 via the communicating section 32 and causes the pattern/character editing section 1 to write the character string information into the drawing (step S21).

Figure 23:
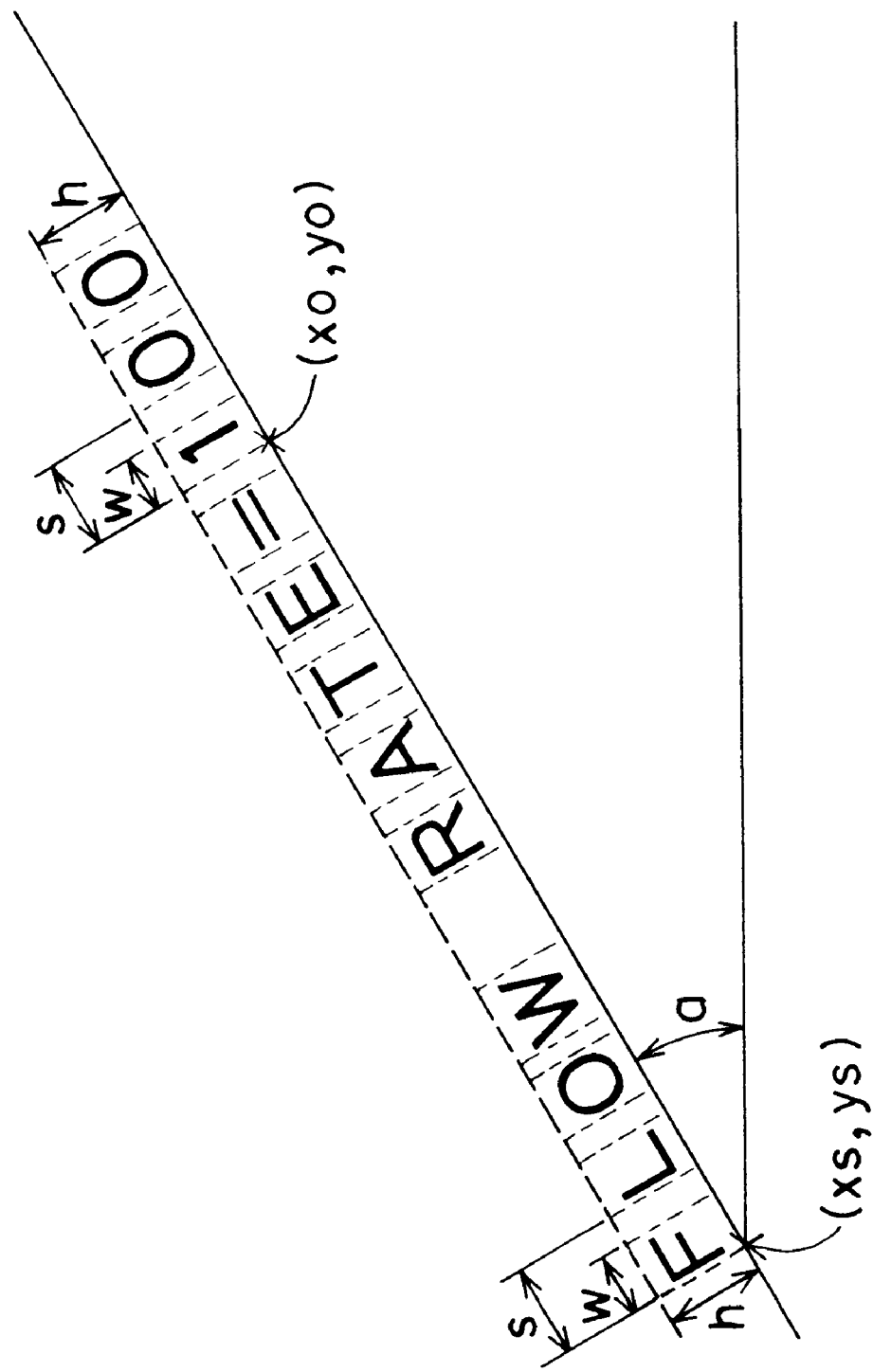
FIG. 23 is a schematic diagram for illustrating the character string creation operation in the drawing processing system of FIG. 7.

For example, as shown in FIG. 23, if the character string of retrieval result is constructed such that the coordinate value of the lower left corner is (xs, ys), the inclination of the character string is a, the spacing of the character is s, the character width is w, and the number of constructing characters is n=10 (ten characters because the character string of the retrieval item is "FLOW RATE=") in the character string "FLOW RATE=" of the extracted retrieval item, then the coordinate value (x0, y0) of the lower left corner of the retrieval result character string "100" is derived by the following equation (1), for example, and the height h, spacing s, character width w and inclination angle a are set to correspond to the character string of the retrieval item "FLOW RATE=".

<Equation 1>

$$x0 = xs + (11 \times s) \times \cos a$$

$$y0 = ys + (11 \times s) \times \sin a$$

A pattern data table containing arrangement information of the result character string is created based on the above information and the retrieval result is written.

Figure 24:
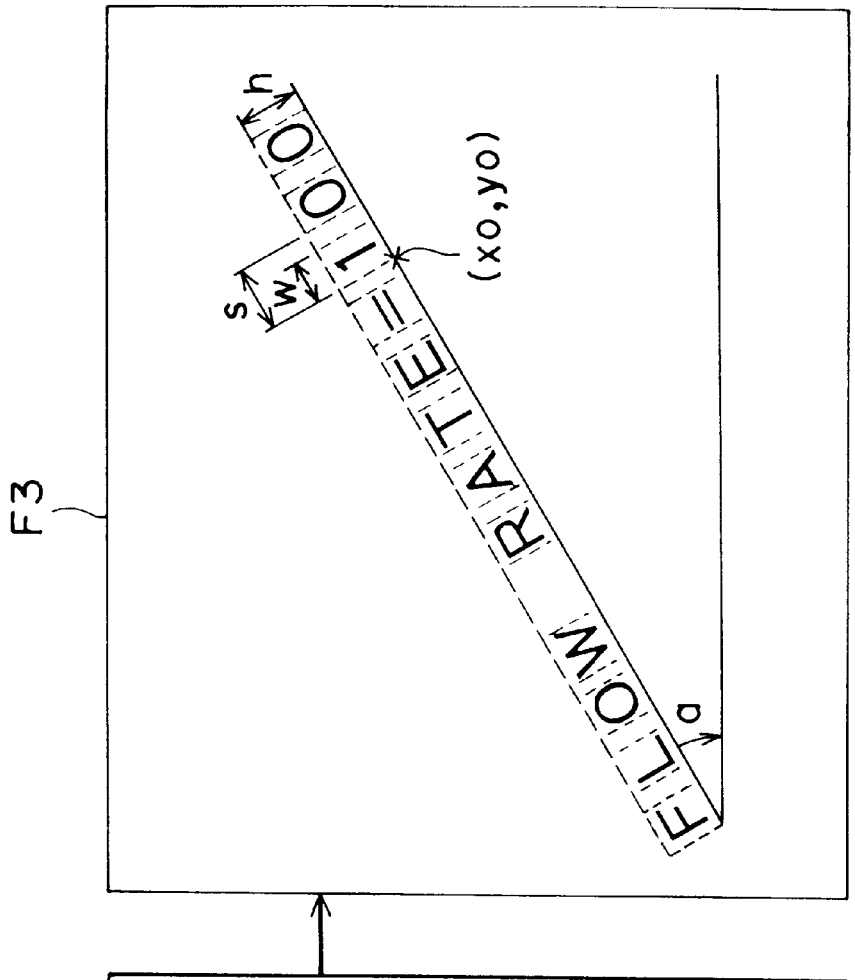
FIG. 24 is a schematic diagram showing an example of the writing of retrieval result, for illustrating the operation of the drawing processing system of FIG. 7

That is, when a pattern data table T3 is created as shown in FIG. 24, the character string "100" of the flow rate which is the retrieval result is written and displayed after the character string "FLOW RATE=" as indicated by the drawing F3 on the display operating section 2.

Figure 18:
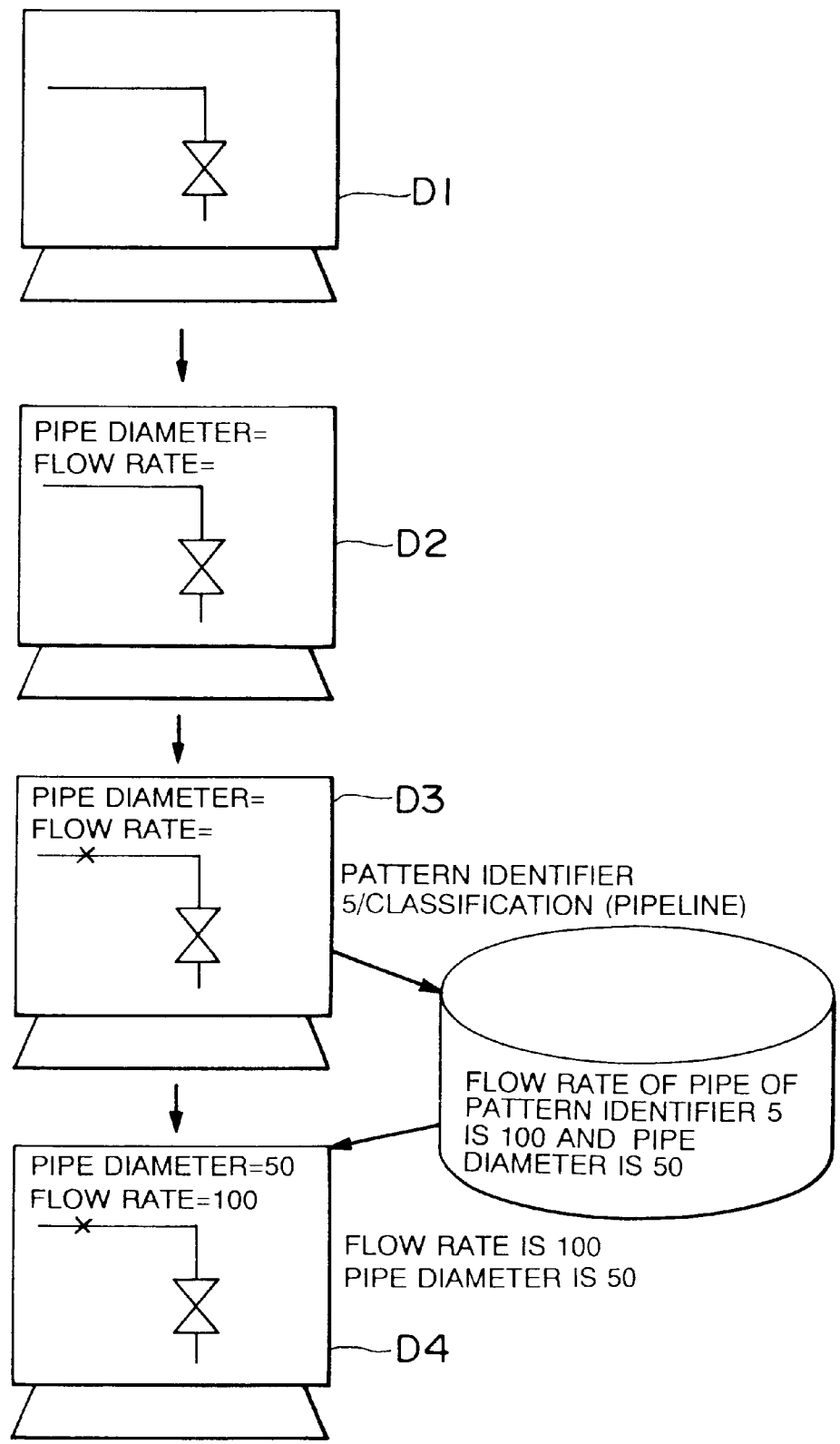
FIG. 18 is a schematic view for illustrating the operation of the drawing processing system of FIG. 7.

Thus, by the extremely simple and clear operations, the retrieval result is entered and displayed as indicated by the display content D4 of FIG. 18. If the content is output by a hard copy, for example, the retrieval result which can be clearly observed and easily determined can be obtained.

For example, in the maintenance service for the plant, the retrieval of measurement data, instrument specification data and the like related to the plant instruments can be effected correctly and in a short period of time.

In the drawing processing system shown in FIG. 7, since both of the specification of the retrieval item and the specification of the position of the retrieval result can be effected by simply entering the retrieval item in a desired position, that is, in a desired position in which it is desired to arrange the retrieval result, the operation which the operator is required to do becomes extremely simple. Further, since the retrieval item and retrieval data are written in the drawing in a corresponding form, the corresponding relation can be easily derived from the drawing. Further, since the above information items are directly written into the drawing data, the information items can be treated as normal information in the drawing.

In the system (first embodiment) of FIG. 6, the item processing section 11 of the retrieval section 3 includes the input requesting section 21 and item extracting section 22 and the pattern specifying section 12 includes the specification requesting section 23 and pattern extracting section 24, but the structure of a combination of the input requesting section 21, item extracting section 22, specification requesting section 23 and pattern extracting section 24 may be adequately changed. For example, it is possible to combine the input requesting section with the specification requesting section so as to simultaneously issue requests for specifications of inputting of the retrieval item and specification of the object pattern and combine the item extracting section with the pattern extracting section so as to simultaneously fetch information of the retrieval item and the object pattern.

Likewise, the order of the steps S11 to S16 in the flowchart of FIG. 8 in the system (second embodiment) of FIG. 7 can be adequately changed only if the request for creation of the retrieval item character string and creation of the retrieval item are effected before information of the retrieval item is fetched and the request for specification of a pattern and specification of the object pattern are effected before information of the object pattern is fetched.

It is apparent that, in this invention, a wide range of different working modes can be formed based on the invention without deviating from the spirit and scope of the invention.

What is claimed is:

1. A method for referring to an information related to a drawing constituted of a plurality of patterns comprising:

an item text inputting step of inputting and writing a retrieval item text related to a drawing represented in a drawing data form into an arbitrary portion in the drawing;

a pattern specifying step of specifying and inputting an object pattern to be retrieved according to the retrieval item text;

a retrieval processing step of retrieving a data base related to the drawing data based on information of the object pattern and retrieval item text input;

a writing step of writing the retrieval result text retrieved from the data base into the drawing data in a position adjoined to the inputted retrieval item text in the drawing; and an outputting step of outputting an image of the drawing with the retrieval item text and the retrieval result text.

2. A method according to claim 1, wherein said item text inputting step includes:

an input request step of suggesting to an operator that a character string of the retrieval item text should be input into the drawing; and a retrieval item text extracting step of extracting the character string of the retrieval item text input into the drawing from the drawing data.

3. A method according to claim 1, wherein said pattern specifying step includes:

a specification request step of suggesting to an operator that an object pattern in the drawing to be retrieved for the retrieval item text should be specified and input; and a pattern extracting step of extracting an identifier of the pattern for the object pattern specified in the drawing.

4. A method according to claim 3, wherein said retrieval processing step is a step of retrieving the data base related to the drawing data and deriving drawing related data corresponding to the identifier of the specified object pattern and input retrieval item text.

5. A method according to claim 1, wherein said writing step includes:

a character creation step of creating a data character string corresponding to the retrieval result text retrieved from the data base; and a character arranging step of arranging the created data character string in position corresponding to the retrieval item text in the drawing and writing the same into the drawing data.

6. A method according to claim 5, wherein said character arranging step includes a step of setting the character attribute of the data character string to correspond to the character attribute of the retrieval item text in the drawing.

7. A method according to claim 1, wherein said drawing data is plant drawing data represented in a CAD data form and the retrieval item test includes at least one of the measurement data and instrument specification data in a plant.

8. A method of referring to an information related to a drawing constituted of a plurality of patterns comprising:

an input request step of suggesting to an operator that a character string of the retrieval item text related to a drawing represented in a drawing data form should be input into an arbitrary portion in the drawing:

a retrieval item text extracting step of extracting the character string of the retrieval item text input into the drawing from the drawing data;

a specification request step of suggesting to the operator that an object pattern in the drawing to be retrieved for the retrieval item text should be specified and input;

a pattern extracting step of extracting a classification of the pattern and an identifier of the pattern for the object pattern specified in the drawing;

a retrieval processing step of retrieving a data base related to the drawing data based on information of the object pattern and retrieval item text input to derive drawing related data corresponding to the classification and identifier of the specified object pattern and the input retrieval item text;

a character creation step of creating a data character string corresponding to the retrieval result text retrieved from the data base;

a character arranging step of arranging the created data character string in position adjoined to the inputted retrieval item text in the drawing and writing the same into the drawing data; and an outputting step of outputting an image of drawing with the retrieval item text and the retrieval result text.

9. A method according to claim 8, wherein said character arranging step includes a step of setting the character attribute of the data character string to correspond to the character attribute of the retrieval item text in the drawing.

10. A method according to claim 8, wherein said drawing data is plant drawing data represented in a CAD data form and the retrieval item text includes at least one of the measurement data and instrument specification data in a plant.

11. An apparatus for referring to an information related to a drawing constituted of a plurality of patterns comprising:

pattern/character editing means for editing patterns and characters constituting a drawing represented in a drawing data form;

data base storing drawing related information related to the drawing represented in the drawing data form;

item text inputting means for inputting and writing a retrieval item text related to the drawing represented in the drawing data form into an arbitrary position of the drawing;

pattern specifying means for specifying an object pattern to be retrieved for the retrieval item text;

retrieving means for retrieving said data base based on information of the retrieval item text and object pattern and deriving data related to drawing data;

writing means for writing the retrieval result text retrieved from said data base by said retrieving means into the drawing data in position adjoined to the inputted retrieval item text in the drawing; and outputting means for outputting an image of the drawing with the retrieval item text and a retrieval result text.

12. An apparatus according to claim 11, wherein said item text inputting means includes input request means for suggesting to an operator that the character string of the retrieval item text should be input into the drawing and retrieval item text extracting means for extracting the character string of the retrieval item text input into the drawing from the drawing data.

13. An apparatus according to claim 11, wherein said pattern specifying means includes specification request means for suggesting to the operator that an object pattern in the drawing to be retrieved for the retrieval item text should be specified, and pattern extracting means for extracting an identifier of the pattern for the object pattern specified in the drawing.

14. An apparatus according to claim 13, wherein said retrieving means includes means for retrieving said data base and for deriving drawing related data corresponding to the identifier of the specified object pattern and input retrieval item text.

15. An apparatus according to claim 12, wherein said writing means includes character creation means for creating a data character string corresponding to the retrieval result text retrieved from said data base, and character arranging means for arranging the created data character string in position corresponding to the retrieval item text in the drawing and for writing the same into the drawing data.

16. An apparatus according to claim 15, wherein said character arranging means includes means for setting the character attribute of the data character string to correspond to the character attribute of the retrieval item text in the drawing.

17. An apparatus for referring to an information related to a drawing constituted of a plurality of patterns comprising:

pattern/character editing means for editing patterns and characters constituting a drawing represented in a drawing data form;

data base for storing drawing related information related to the drawing represented in the drawing data form;

input request means for suggesting to an operator that the character string of the retrieval item text related to the drawing represented in the drawing data form should be input into an arbitrary portion in the drawing;

retrieval item text extracting means for extracting the character string of the retrieval item text input into the drawing from the drawing data;

specification request means for suggesting to the operator that an object pattern in the drawing to be retrieved for the retrieval item text should be specified;

pattern extracting means for extracting an identifier of the pattern and a classification of the pattern for the object pattern specified in the drawing;

retrieving means for retrieving said data base based on information of the object pattern and input retrieval item text and for deriving drawing related data corresponding to an identifier and classification of the specified object pattern and input retrieval item text;

character string creation means for creating a data character string corresponding to the retrieval result text retrieved from said data base;

character arranging means for arranging the created data character string in position adjoined to the character string of the retrieval item text in the drawing and writing the same into the drawing data; and outputting means for outputting an image of the drawing with the retrieval item text and the retrieval result text.

18. An apparatus according to claim 17, wherein said character arranging means includes means for setting the character attribute of the data character string to correspond to the character attribute of the retrieval item text in the drawing.

19. An apparatus for referring to related information comprising:

pattern/character editing means for editing patterns and characters constituting a drawing represented in a drawing data form;

data base means for storing drawing data related to the drawing represented in the drawing data form;

communicating means for transferring drawing data containing a control instruction and position information with respect to said pattern/character editing means;

retrieval processing means for extracting the retrieval of said data base means and the retrieval result text thereof; and retrieval management means for inputting a retrieval item text related to the drawing represented in the drawing data form into an arbitrary position of the drawing on an image plane on which the drawing is displayed via said communicating means by use of said pattern/character editing means, specifying and inputting an object pattern to be retrieved for the retrieval item text on the image plane, retrieving said data base means via said retrieval processing means based on the object pattern and the retrieval item text obtained as the result text of the above operation to derive corresponding data, supplying the corresponding data to said pattern/character editing means via said communicating means, and writing the corresponding data into the drawing data in position corresponding to the retrieval item text in the drawing.

* * * * *

UNITED STATES PATENT AND TRADEMARK OFFICE
CERTIFICATE OF CORRECTION

PATENT NO.  : 5,913,220
DATED       : June 15, 1999
INVENTOR(S) : Eiji TAKAHASHI It is certified that error appears in the above-identified patent and that said Letters Patent is hereby corrected as shown below:

Col. 14, line 53, change "test" to --text--.

Signed and Sealed this

Ninth Day of November, 1999

Attest:

Q. TODD DICKINSON

Attesting Officer

Acting Commissioner of Patents and Trademarks